United States Patent
Chilukuri et al.

(10) Patent No.: US 11,566,583 B2
(45) Date of Patent: Jan. 31, 2023

(54) FLUID SCOOP FOR A THRUST REVERSER SYSTEM

(71) Applicant: Rohr, Inc., Chula Vista, CA (US)

(72) Inventors: Radhakrishna Chilukuri, San Diego, CA (US); Ashok Babu Saya, Bangalore (IN); Hussain Mahamed Javed Tapadar, Bengaluru (IN)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/667,888

(22) Filed: Feb. 9, 2022

(65) Prior Publication Data

US 2022/0268237 A1  Aug. 25, 2022

(30) Foreign Application Priority Data

Feb. 9, 2021 (IN) .............................. 202111005483

(51) Int. Cl.
*F02K 1/56* (2006.01)

(52) U.S. Cl.
CPC .......... *F02K 1/56* (2013.01); *F05D 2220/323* (2013.01)

(58) Field of Classification Search
CPC . F02K 1/56; F02K 1/563; F02K 1/566; F02K 1/58; F02K 1/60; F02K 1/62; F02K 1/625
See application file for complete search history.

(56) References Cited

U.S. PATENT DOCUMENTS

| | | | |
|---|---|---|---|
| 3,568,792 A * | 3/1971 | Urquhart | F02K 1/46 239/265.19 |
| 3,721,314 A | 3/1973 | Hoch | |
| 3,739,582 A * | 6/1973 | Maison | F02K 1/70 239/265.29 |
| 4,671,460 A | 6/1987 | Kennedy | |
| 4,894,985 A | 1/1990 | Dubois | |
| 5,347,808 A | 9/1994 | Standish | |
| 6,029,439 A | 2/2000 | Gonidec | |
| 6,151,883 A * | 11/2000 | Hatrick | F15D 1/12 239/265.29 |
| 6,158,211 A * | 12/2000 | Gonidec | F02K 1/70 60/226.2 |
| 6,402,092 B1 | 6/2002 | Jean | |
| 6,725,541 B1 * | 4/2004 | Holme | F02K 1/54 29/889.22 |
| 9,068,532 B2 | 6/2015 | Gormley | |
| 9,371,799 B2 | 6/2016 | Packard | |
| 9,527,238 B2 * | 12/2016 | Kruckenberg | B29C 66/301 |
| 9,587,582 B1 * | 3/2017 | Schaefer | F02K 1/72 |
| 9,719,466 B2 | 8/2017 | Nakhjavani | |

(Continued)

OTHER PUBLICATIONS

EP search report for EP22155980.0 dated Oct. 17, 2022.

*Primary Examiner* — Craig Kim
(74) *Attorney, Agent, or Firm* — Getz Balich LLC

(57) ABSTRACT

An assembly is provided for an aircraft propulsion system. This aircraft propulsion system assembly includes a thrust reverser system. The thrust reverser system includes a cascade structure and a scoop. The cascade structure is configured with a plurality of flow passages. Each of the flow passages extends through the cascade structure. The flow passages include a first flow passage. The scoop is configured to direct fluid into at least the first flow passage. The scoop includes a serrated leading edge.

20 Claims, 14 Drawing Sheets

(56) References Cited

U.S. PATENT DOCUMENTS

| | | | |
|---|---|---|---|
| 9,915,226 B2 | 3/2018 | Gormley | |
| 10,184,426 B2 | 1/2019 | Schrell | |
| 10,502,161 B2* | 12/2019 | Crawford | F02K 1/72 |
| 10,556,672 B2 | 2/2020 | Paolini | |
| 10,590,885 B2 | 3/2020 | Acheson | |
| 10,598,127 B2* | 3/2020 | Wadsworth | F02K 1/54 |
| 10,648,426 B2* | 5/2020 | Smith | F01D 9/041 |
| 10,794,328 B2* | 10/2020 | Gormley | F02K 1/72 |
| 10,837,404 B2 | 11/2020 | Aziz | |
| 11,004,128 B1* | 5/2021 | Mishra | G06Q 30/0631 |
| 11,028,801 B2* | 6/2021 | Bourdeau | F02K 1/72 |
| 11,408,347 B2* | 8/2022 | Reuter | F02C 9/263 |
| 2012/0036716 A1* | 2/2012 | Urban | F02K 1/72 |
| | | | 29/889 |
| 2014/0027536 A1* | 1/2014 | Gormley | F02K 1/70 |
| | | | 239/265.19 |
| 2014/0030057 A1* | 1/2014 | Gormley | F02K 1/42 |
| | | | 415/126 |
| 2016/0076487 A1 | 3/2016 | Nakhjavani | |
| 2016/0230702 A1* | 8/2016 | Charron | F02K 1/766 |
| 2016/0243806 A1 | 8/2016 | Frost | |
| 2016/0341150 A1* | 11/2016 | Chuck | F02K 1/72 |
| 2017/0058829 A1* | 3/2017 | Dong | F02K 1/605 |
| 2017/0321602 A1* | 11/2017 | Guijarro Valencia | F02C 9/18 |
| 2020/0003151 A1* | 1/2020 | Carr | F02K 1/72 |
| 2020/0003152 A1 | 1/2020 | Gormley | |
| 2020/0340426 A1 | 10/2020 | Chelin | |
| 2022/0112864 A1* | 4/2022 | Chilukuri | F02K 1/72 |
| 2022/0186683 A1* | 6/2022 | Chilukuri | F02K 1/72 |
| 2022/0202317 A1* | 6/2022 | Taghioskoui | A61B 18/203 |
| 2022/0243681 A1* | 8/2022 | West | F02K 1/72 |

* cited by examiner

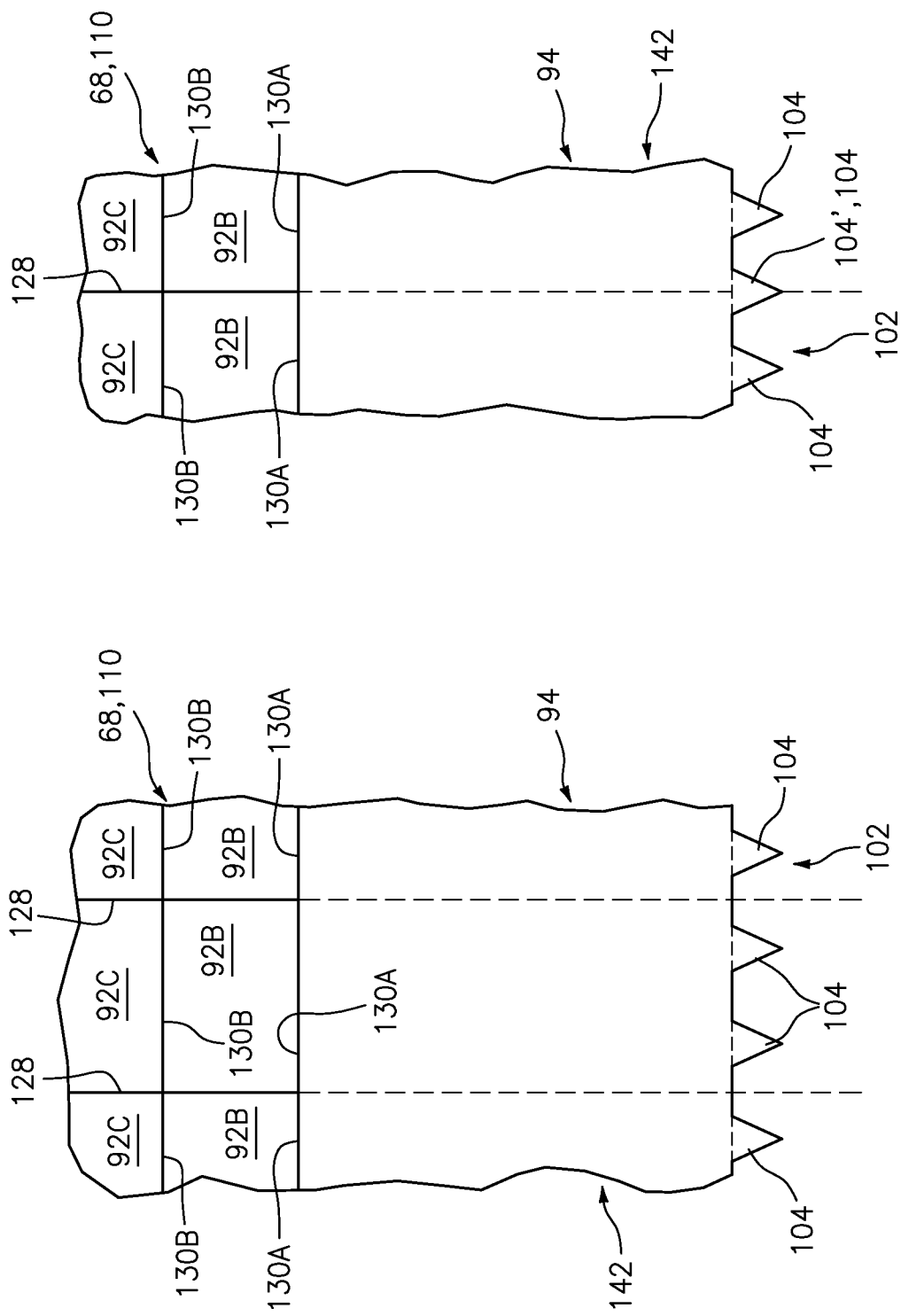

FLUID SCOOP FOR A THRUST REVERSER SYSTEM

This application claims priority to Indian Patent Appln. No. 202111005483 filed Feb. 9, 2021, which is hereby incorporated herein by reference in its entirety.

BACKGROUND

1. Technical Field

This disclosure relates generally to an aircraft propulsion system and, more particularly, to a thrust reverser system for the aircraft propulsion system.

2. Background Information

An aircraft propulsion system may include a thrust reverser system for redirecting an airflow from a generally aft direction to a generally forward direction during aircraft landing. Various types and configurations of thrust reverser systems are known in the art. While these known thrust reverser systems have various benefits, there is still room in the art for improvement. There is a need in the art therefore for an improved thrust reverser system which may, for example, increase thrust reverser system efficiency, reduce thrust reverser system size, reduce thrust reverser system weight, and/or reduce nacelle maximum diameter.

SUMMARY OF THE DISCLOSURE

According to an aspect of the present disclosure, an assembly is provided for an aircraft propulsion system. This aircraft propulsion system assembly includes a thrust reverser system. The thrust reverser system includes a cascade structure and a scoop. The cascade structure is configured with a plurality of flow passages. Each of the flow passages extends through the cascade structure. The flow passages include a first flow passage. The scoop is configured to direct fluid into at least the first flow passage. The scoop includes a serrated leading edge.

According to another aspect of the present disclosure, another assembly is provided for an aircraft propulsion system. This aircraft propulsion system assembly includes a thrust reverser system. The thrust reverser system includes a cascade structure and a scoop. The cascade structure includes a plurality of flow passages and a plurality of cascade vanes. A side boundary of each of the flow passages is formed by a respective one of the cascade vanes. The flow passages include a first flow passage. The scoop is configured to direct fluid into at least the first flow passage. The scoop includes a base and a plurality of protrusions. The protrusions are arranged along an upstream end of the base. Each of the protrusions has a tip. Each of the protrusions projects out from the upstream end of the base and laterally tapers to the tip.

According to still another aspect of the present disclosure, another assembly is provided for an aircraft propulsion system. This aircraft propulsion system assembly includes a thrust reverser cascade structure. This thrust reverser cascade structure extends axially along a centerline from an upstream end to a downstream end. The thrust reverser cascade structure is configured with a plurality of flow passages and a plurality of vanes. A side boundary of each of the flow passages is formed by a respective one of the vanes. The vanes include a first vane. The first vane is configured with a serrated leading edge.

The aircraft propulsion system assembly may also include a scoop configured with the first vane. The scoop may project out from an upstream end of the first vane to the serrated leading edge.

The scoop may include a base and a plurality of protrusions. The protrusions may be arranged along an upstream end of the base. Each of the protrusions may project out from the base. The serrated leading edge may be formed at least by the protrusions.

The protrusions may include a first protrusion and a second protrusion. The first protrusion may laterally neighbor the second protrusion. The first protrusion may be laterally spaced from the second protrusion by a lateral inter-protrusion distance.

The first protrusion may have a chord length that extends from the upstream end of the base to a distal end of the first protrusion. The lateral inter-protrusion distance may be between two-third times the chord length and one and one-half times the chord length.

The serrated leading edge may also be formed by the base at the upstream end of the base.

The protrusions may have common configurations.

The protrusions may include a first protrusion. The first protrusion may have a triangular geometry.

The protrusions may include a first protrusion. The first protrusion may have a chord length and a span length. An aspect ratio of two times the span length to the chord length may be between 1 and 2.5. The chord length may extend from the upstream end of the base to a distal end of the first protrusion. The span length may extend laterally along the base between opposing sides of the first protrusion at the upstream end of the base.

The protrusions may include a first protrusion. The first protrusion may have a tip, a first protrusion side and a second protrusion side that meets the first protrusion side at the tip. The first protrusion side may be angularly offset from the second protrusion side by an angle between twenty degrees and sixty degrees.

The base may have a base length that extends longitudinally along a camber line from the cascade structure to the upstream end of the base. The base length may be between two times and four times a variable X. The protrusions may include a first protrusion. The first protrusion may have a chord length that extends longitudinally along the camber line from the upstream end of the base to a distal end of the first protrusion. The chord length may be between one-third times and one times the variable X.

The protrusions may include a first protrusion and a second protrusion. The first protrusion may be laterally aligned with the first flow passage. The second protrusion may be laterally aligned with the first flow passage.

The flow passages may also include a second flow passage laterally next to the first flow passage. The protrusions may include a first protrusion and a second protrusion. The first protrusion may be laterally aligned with the first flow passage. The second protrusion may be laterally aligned with the second flow passage.

The flow passages may also include a second flow passage. The first protrusion may laterally overlap the first flow passage and the second flow passage.

The cascade structure may include a plurality of cascade vanes. A boundary of each of the flow passages may be formed by a respective one of the cascade vanes. The scoop may be integral with and may form an extension of a first of the cascade vanes.

The aircraft propulsion system assembly may also include a forward thrust duct. The thrust reverser system may also include a thrust reverser duct and a bullnose ramp. The cascade structure may be arranged within the thrust reverser duct. The bullnose ramp may be adapted to provide a transition from the forward thrust duct to the thrust reverser duct when the thrust reverser system is in a deployed configuration. The scoop may be connected to the bullnose ramp by one or more supports.

The cascade structure may extend axially along a centerline from a cascade structure upstream end to a cascade structure downstream end. The first flow passage may be an axially upstream-most one of the flow passages.

The serrated leading edge may extend laterally along an entirety of a lateral length of the first flow passage.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 13 is a plan view illustration of a portion of the fluid scoop with an upstream portion of the cascade basket, where the fluid scoop has a first arrangement of protrusions.

FIG. 14 is a plan view illustration of a portion of the fluid scoop with an upstream portion of the cascade basket, where the fluid scoop has a second arrangement of protrusions.

DETAILED DESCRIPTION

Figure 1:
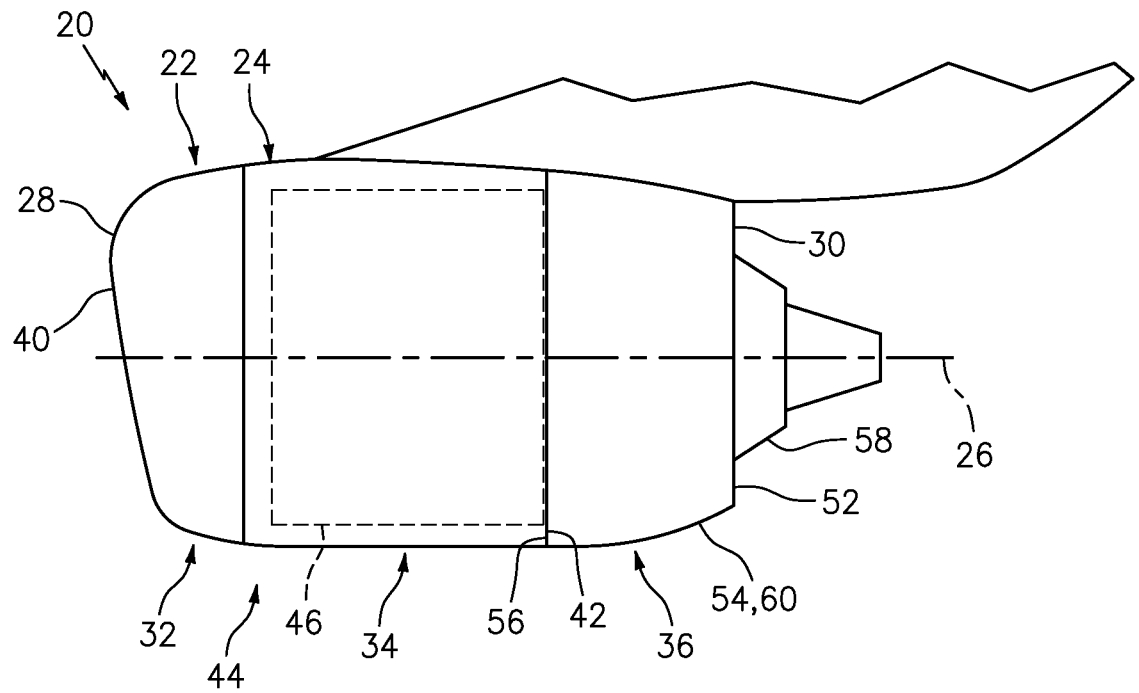
FIG. 1 is a side illustration of an aircraft propulsion system with its thrust reverser system in a stowed configuration.

FIG. 1 illustrates an aircraft propulsion system 20 for an aircraft such as, but not limited to, a commercial airliner or a cargo plane. The propulsion system 20 includes a nacelle 22 and a gas turbine engine. This gas turbine engine may be configured as a high-bypass turbofan engine. Alternatively, the gas turbine engine may be configured as a turbojet engine or any other type of gas turbine engine capable of propelling the aircraft during flight.

The nacelle 22 is configured to house and provide an aerodynamic cover for the gas turbine engine. An outer structure 24 of the nacelle 22 extends axially along an axial centerline 26 (e.g., a centerline of the propulsion system 20, the nacelle 22 and/or the gas turbine engine) between a nacelle forward end 28 and a nacelle aft end 30. The nacelle outer structure 24 of FIG. 1 includes a nacelle inlet structure 32, one or more fan cowls 34 (one such cowl visible in FIG. 1) and a nacelle aft structure 36, which is configured as part of or includes a thrust reverser system 38 (see also FIG. 2).

The inlet structure 32 is disposed at the nacelle forward end 28. The inlet structure 32 is configured to direct a stream of air through an inlet opening 40 at the nacelle forward end 28 and into a fan section of the gas turbine engine.

The fan cowls 34 are disposed axially between the inlet structure 32 and the aft structure 36. Each fan cowl 34 of FIG. 1, in particular, is disposed at (e.g., on, adjacent or proximate) an aft end 42 of a stationary portion 44 of the nacelle 22, and extends forward to the inlet structure 32. Each fan cowl 34 is generally axially aligned with the fan section of the gas turbine engine. The fan cowls 34 are configured to provide an aerodynamic covering for a fan case 46.

Figure 3:
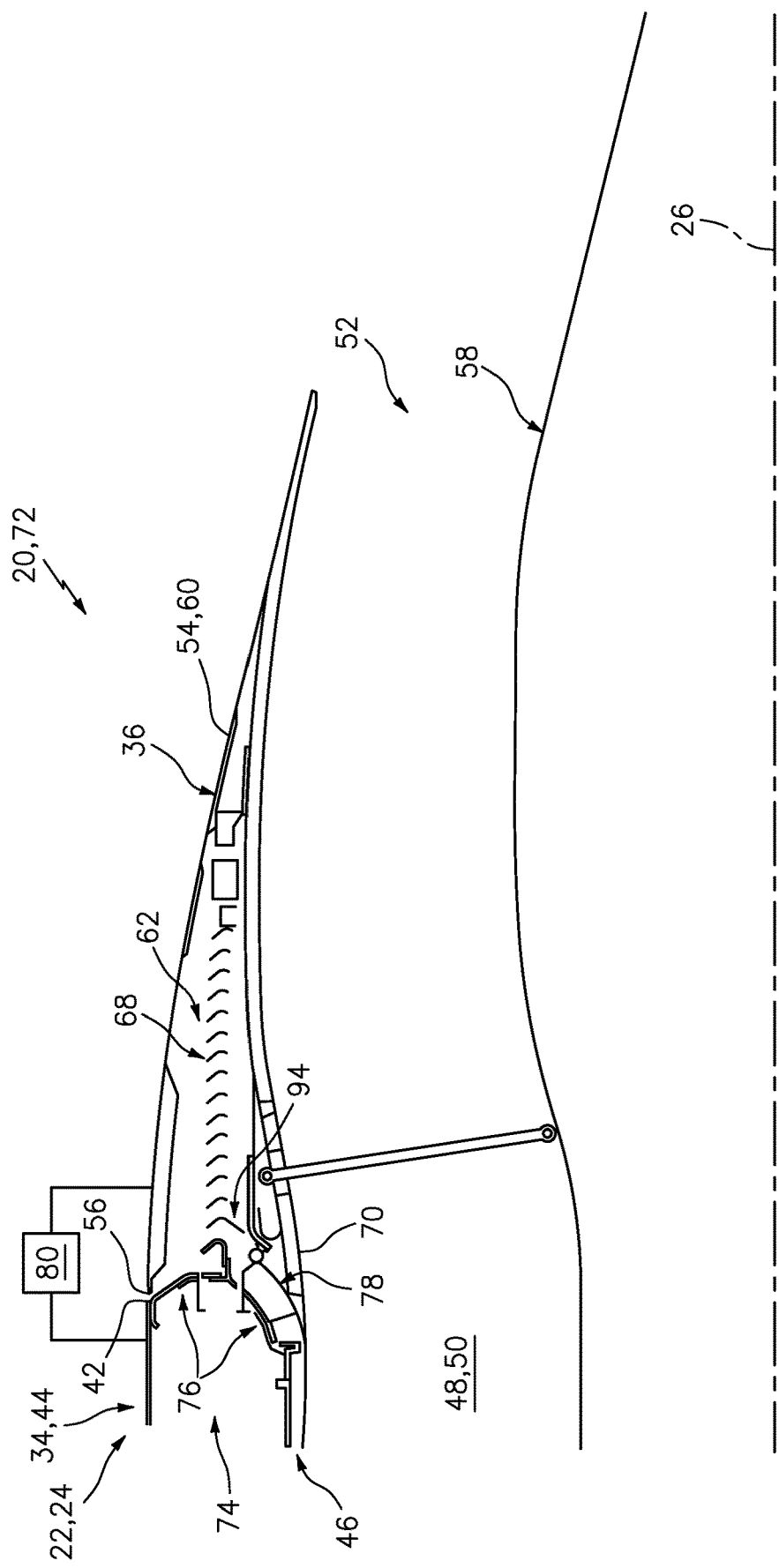
FIG. 3 is a side sectional illustration of a portion of the aircraft propulsion system with its thrust reverser system in the stowed configuration.

Briefly, the fan case 46 extends circumferentially around the axial centerline 26 and thereby circumscribes the fan section. Referring to FIG. 3, the fan case 46 along with the nacelle 22 form a forward outer peripheral boundary of a forward thrust duct 48 of the propulsion system 20. In the embodiment of FIG. 3, the forward thrust duct 48 is configured as a bypass duct. The forward thrust duct 48 of FIG. 3, for example, at least partially or completely forms a bypass flowpath 50 within the propulsion system 20, which bypass flowpath 50 bypasses (e.g., flows around and/or outside of, not through) a core of the gas turbine engine to a bypass nozzle 52. Thus, during nominal propulsion system operation (e.g., when the thrust reverser system 38 is in its stowed configuration; see FIG. 3), the forward thrust duct 48 is configured to facilitate forward thrust for the propulsion system 20; e.g., direct fluid (e.g., fan/compressed air) out of the propulsion system 20 through the bypass nozzle 52 in an axially aft direction.

Referring again to FIG. 1, the aft structure 36 includes a translating sleeve 54 for the thrust reverser system 38. The translating sleeve 54 of FIG. 1 is disposed at the nacelle aft end 30. This translating sleeve 54 extends axially along the axial centerline 26 between a forward end 56 of the translating sleeve 54 and the nacelle aft end 30. The translating sleeve 54 is configured to partially form an aft outer peripheral boundary of the forward thrust duct 48 and its flowpath 50 (see FIG. 3). The translating sleeve 54 may also be configured to form the bypass nozzle 52 for the bypass flowpath 50 with an inner structure 58 of the nacelle 22 (e.g., an inner fixed structure (IFS)), which nacelle inner structure 58 houses the core of the gas turbine engine. Briefly, the turbine engine core typically includes a compressor section, a combustor section and a turbine section of the gas turbine engine.

The translating sleeve 54 of FIG. 1 includes a pair of sleeve segments 60 (e.g., halves) arranged on opposing sides of the propulsion system 20 (one such sleeve segment visible in FIG. 1). The present disclosure, however, is not limited to such an exemplary translating sleeve configuration. For example, the translating sleeve 54 may alternatively have a substantially tubular body. For example, the translating sleeve 54 may extend more than three-hundred and thirty degrees (330°) around the axial centerline 26.

Figure 2:
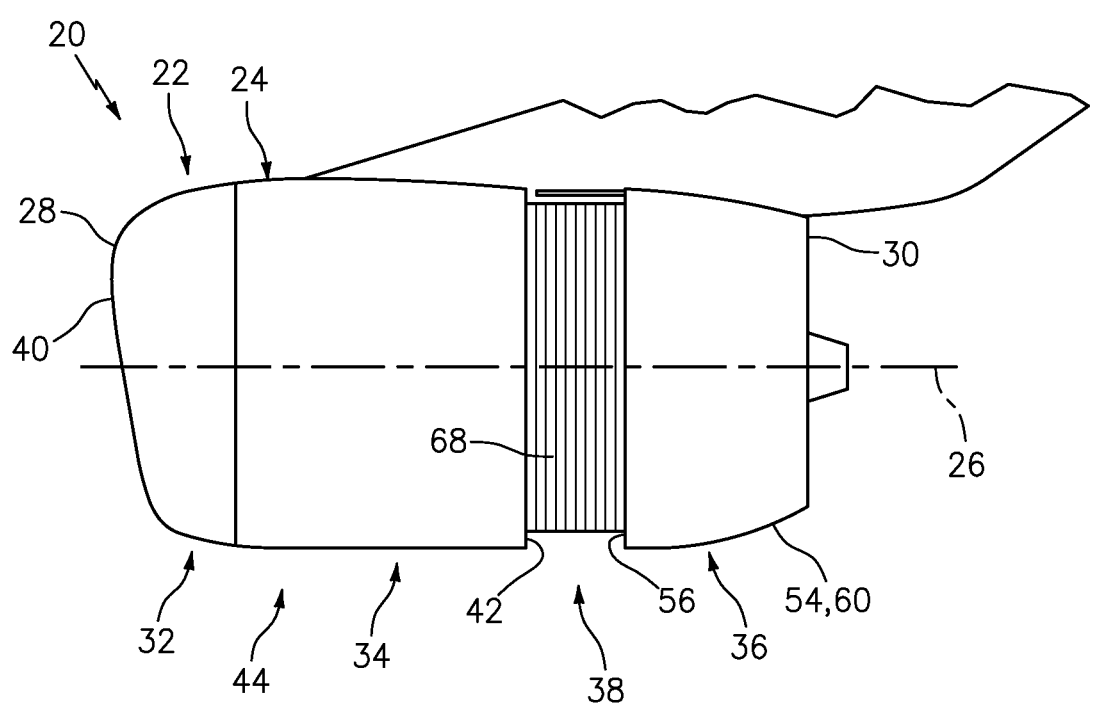
FIG. 2 is a side illustration of the aircraft propulsion system with its thrust reverser system in a deployed configuration.

Referring to FIGS. 1 and 2, the translating sleeve 54 is an axially translatable structure. Each translating sleeve segment 60, for example, may be slidably connected to one or more stationary structures (e.g., a pylon and a lower bifurcation) through one or more respective track assemblies. Each track assembly may include a rail mated with a track beam; however, the present disclosure is not limited to the foregoing exemplary sliding connection configuration.

With the foregoing configuration, the translating sleeve 54 may translate axially along the axial centerline 26 and relative to the stationary portion 44. The translating sleeve 54 may thereby move axially between a forward stowed position (see FIGS. 1 and 3) where the thrust reverser system 38 is in the stowed configuration and an aft deployed position (see FIGS. 2 and 4) where the thrust reverser system 38 is in a deployed configuration.

In the forward stowed position of FIG. 3, the translating sleeve 54 provides the functionality described above.

Figure 4:
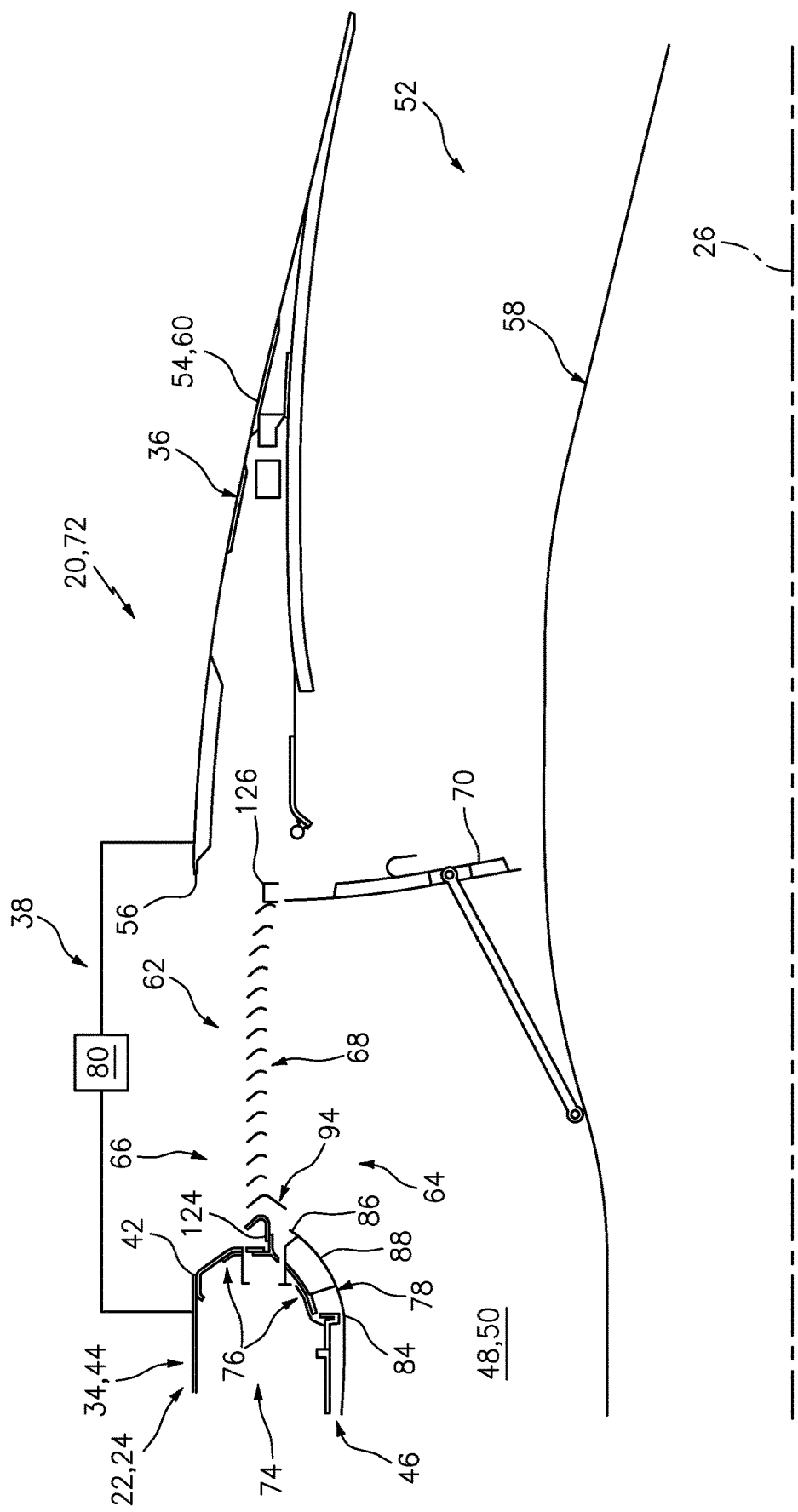
FIG. 4 is a side sectional illustration of a portion of the aircraft propulsion system with its thrust reverser system in the deployed configuration.

In the aft deployed position of FIG. 4, the translating sleeve 54 opens one or more thrust reverser ducts 62 (one visible in the figures), where each thrust reverser duct 62 extends radially through the nacelle outer structure 24 from a thrust reverser duct inlet 64 to a thrust reverser duct outlet 66. The thrust reverser duct inlet 64 is located radially adjacent the forward thrust duct 48 and fluidly couples the respective thrust reverser duct 62 with the forward thrust duct 48 when the thrust reverser system 38 is in its deployed configuration.

In the aft deployed position of FIG. 4, the translating sleeve 54 may also uncover one or more additional components of the thrust reverser system 38. The translating sleeve 54 of FIG. 4, for example, also uncovers one or more cascade structures 68 (e.g., cascade halves) (one cascade structure visible in FIGS. 2 and 4). In addition, as the translating sleeve 54 moves from the stowed position to the deployed position, one or more blocker doors 70 (see FIGS. 3 and 4) arranged with the translating sleeve 54 may be deployed to divert the fluid (e.g., fan/compressed air) from the forward thrust duct 48 and its flowpath 50 into the one or more thrust reverser ducts 62 and through the cascade structure 68 to provide reverse thrust for the propulsion system 20; e.g., direct the fluid out of the propulsion system 20 through the thrust reverser duct outlet 66 generally in an axially forward direction and/or a radially outward direction.

FIG. 3 is a partial side sectional illustration of an assembly 72 for the propulsion system 20 with the thrust reverser system 38 in its stowed configuration. FIG. 4 is a partial side sectional illustration of the propulsion system assembly 72 with the thrust reverser system 38 in its deployed configuration. The propulsion system assembly 72 of FIGS. 3 and 4 includes the fan case 46, a nacelle fixed structure 74, the cascade structures 68 (one visible in FIGS. 3 and 4), the blocker doors 70 and the translating sleeve 54.

The fixed structure 74 circumscribes and axially overlaps the fan case 46. The fixed structure 74 includes one or more internal support structures 76 (one visible in FIGS. 3 and 4) and one or more inlet bullnose ramps 78 (e.g., a fan ramp fairing) for the thrust reverser system 38 (one visible in FIGS. 3 and 4).

The support structures 76 are arranged circumferentially about the axial centerline 26. One of the support structures 76, for example, may be arranged on one side of the propulsion system 20 and another one of the support structures 76 may be arranged on the other opposing side of the propulsion system 20. Each support structure 76 may provide a radial support (e.g., a landing) for a respective one of the fan cowls 34. Each support structure 76 may also or alternatively provide support for one or more components of the thrust reverser system 38 such as, but not limited to, a respective one of the cascade structures 68 and/or a respective one of the bullnose ramps 78. Of course, in other embodiments, the support structures 76 may be combined into a single generally annular support structure.

Each support structure 76 of FIGS. 3 and 4 may be configured as or otherwise include a structural beam; e.g., a torque box. The structural beam provides a base structure to which a respective one of the cascade structures 68 and/or a respective one of the bullnose ramps 78 may be mounted. The structural beam also provides a base structure to which one or more actuators 80 (e.g., hydraulic/pneumatic actuators, or electric motors, etc.) may be mounted. Briefly, the actuators 80 are arranged circumferentially about the axial centerline 26. These actuators 80 are configured to move (e.g., axially translate) the translating sleeve 54 axially along the axial centerline 26 relative to the fixed structure 74 between the stowed position of FIG. 3 and the deployed position of FIG. 4.

The bullnose ramps 78 are arranged circumferentially about the axial centerline 26. One of the bullnose ramps 78, for example, may be arranged on one side of the propulsion system 20 and another one of the bullnose ramps 78 may be arranged on the other opposing side of the propulsion system 20. More particularly, each of the bullnose ramps 78 is aligned with and partially forms the inlet 64 into a respective one of the thrust reverser ducts 62. Each bullnose ramp 78 of FIG. 4, for example, is configured to form a forward and/or upstream boundary (e.g., forward, upstream axial peripheral side) of the respective thrust reverser duct inlet 64. Each bullnose ramp 78 of FIG. 4 is thereby also configured to provide a (e.g., smooth and/or aerodynamic) transition from the forward thrust duct 48 to the respective thrust reverser duct 62 when the thrust reverser system 38 is in its deployed configuration.

Figure 5:
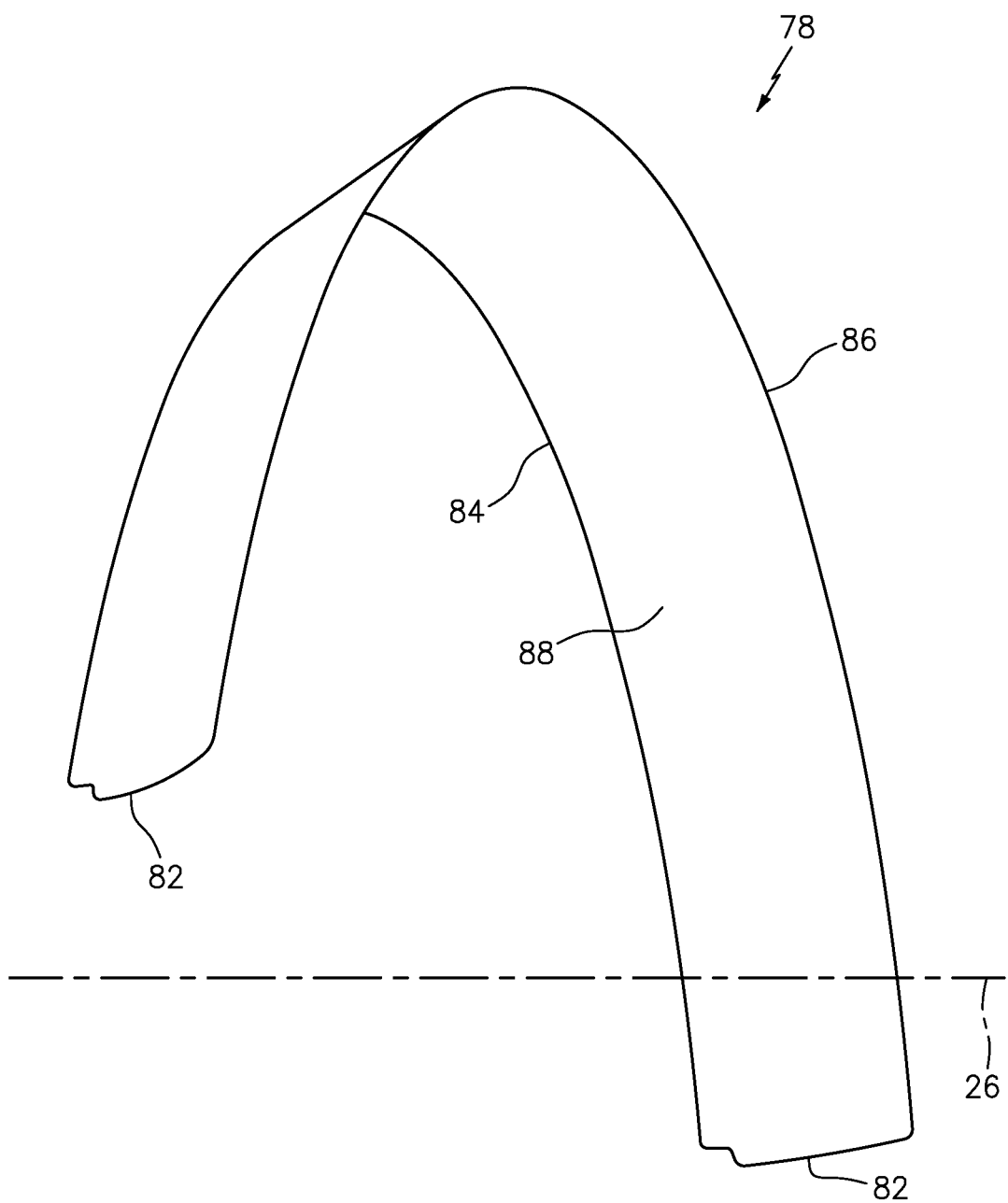
FIG. 5 is a perspective illustration of a bullnose ramp.

Each bullnose ramp 78 of FIG. 5 extends circumferentially about the axial centerline 26 between and to opposing circumferential ends 82. Each bullnose ramp 78 extends axially along the axial centerline 26 between and to a bullnose ramp first (e.g., forward and/or upstream) side and/or edge 84 and a bullnose ramp second (e.g., aft and/or downstream) side and/or edge 86. Each bullnose ramp 78 includes a bullnose ramp surface 88 (e.g., a transition surface) at a radial inner side of the respective bullnose ramp 78. This bullnose ramp surface 88 is configured to provide a smooth aerodynamic transition from the forward thrust duct 48 to the respective thrust reverser duct 62 (see FIG. 4). The bullnose ramp surface 88 of FIG. 5 is thereby configured with an eased, ramped and/or otherwise flared sectional geometry. The bullnose ramp surface 88 of FIG. 5, for example, is configured with curved (e.g., arcuate) and/or splined sectional geometry when viewed, for example, in a plane parallel and/or coincident with the axial centerline 26; e.g., plane of FIG. 4.

Figure 6:
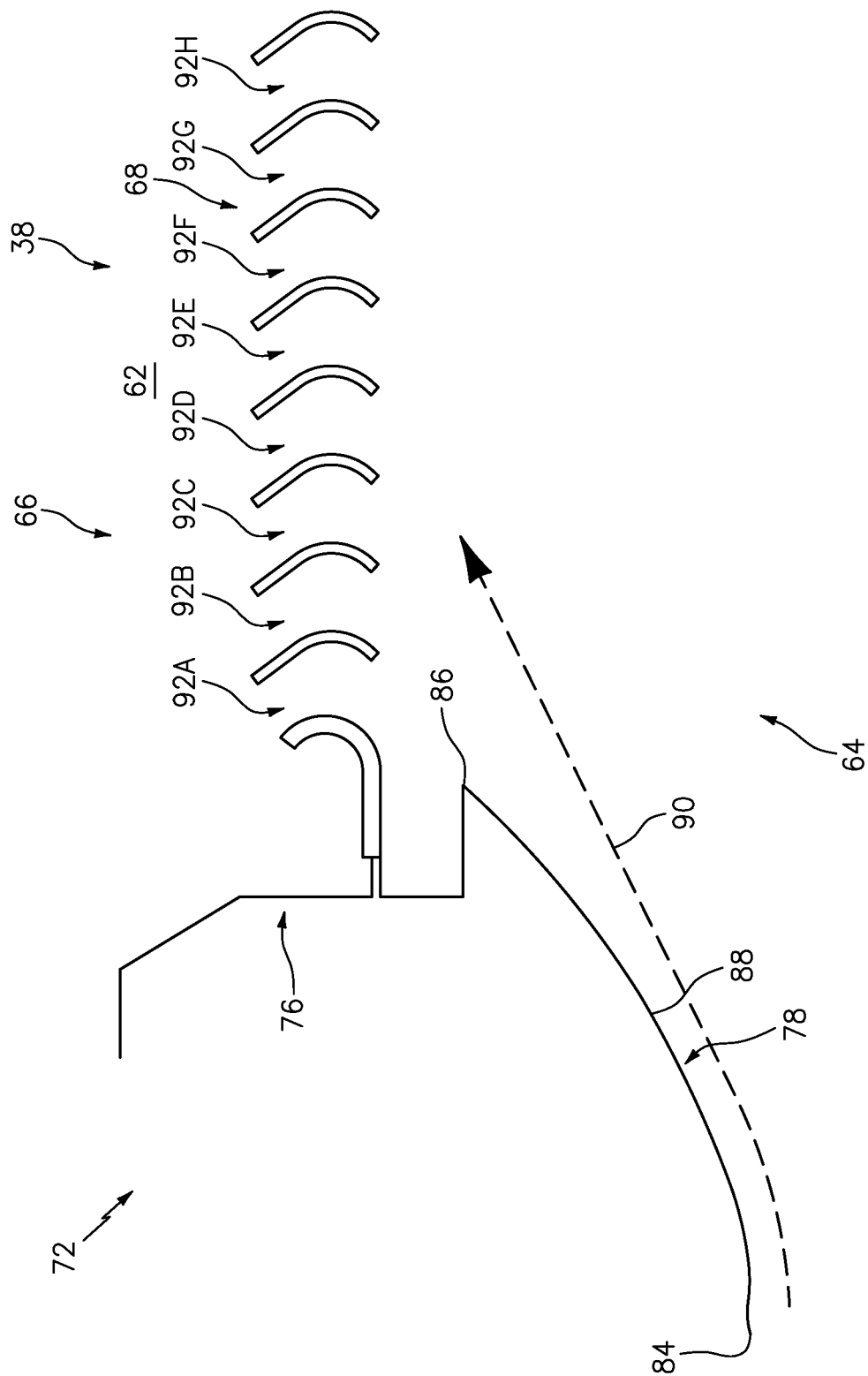
FIG. 6 is a side sectional illustration of boundary layer fluid separating from the bullnose ramp during thrust reverser system operation, where the thrust reverser system is configured without a fluid scoop.

Referring to FIG. 6, when the thrust reverser system 38 is in its deployed configuration (e.g., the blocker doors 70 and the translating sleeve 54 are deployed as shown in FIG. 4), fluid (e.g., fan and/or compressed air) may be directed out of the forward thrust duct 48 and into each thrust reverser duct 62. Under certain conditions and/or with certain bullnose ramp surface geometries, boundary layer fluid 90 flowing along each bullnose ramp surface 88 may separate from the respective bullnose ramp 78. As a result, very little fluid may flow into and through forward and/or upstream flow passages 92A-C (e.g., airflow channels) in the respective cascade structure 68; see also FIG. 8.

Figure 7:
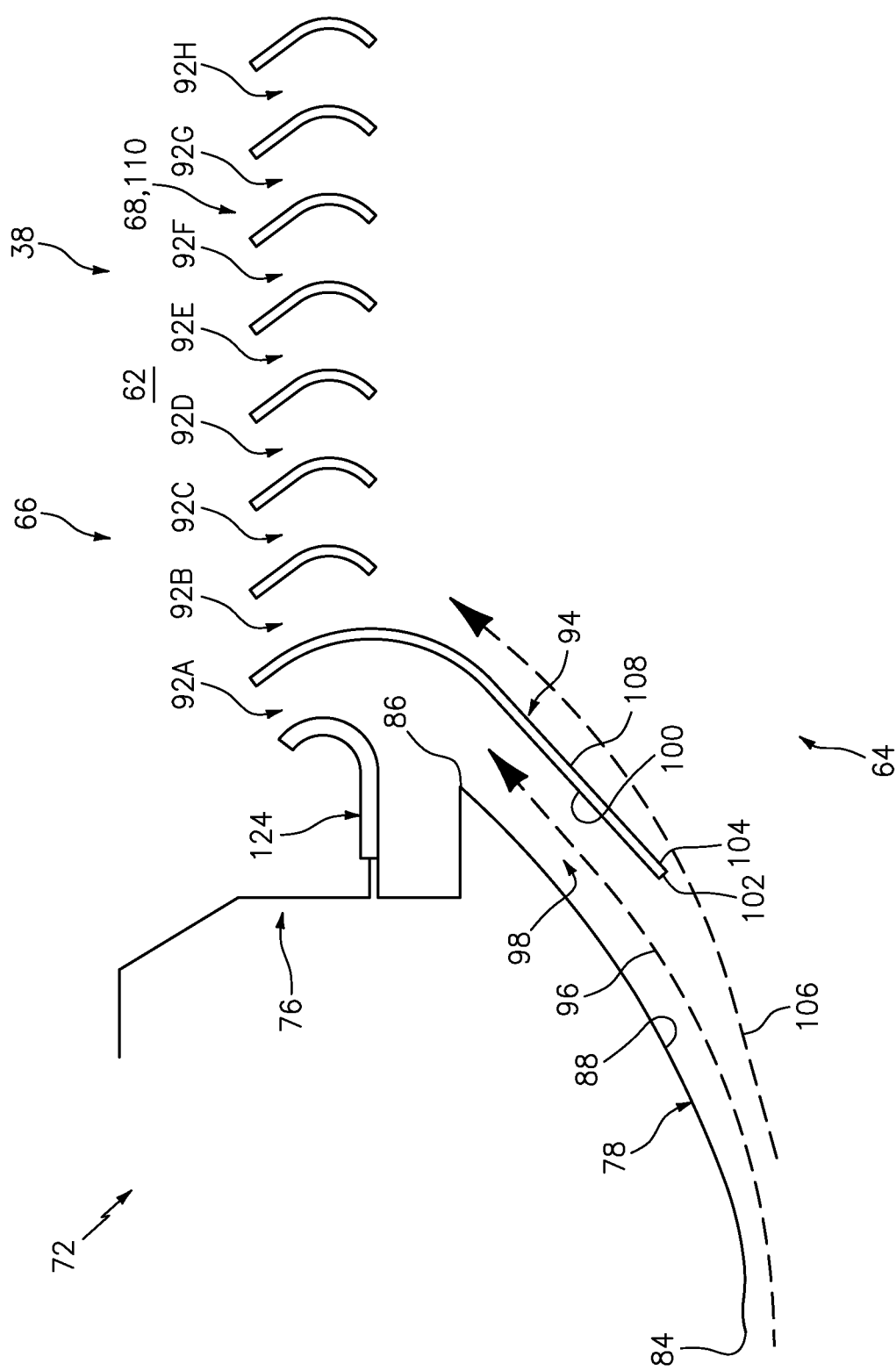
FIG. 7 is a side sectional illustration of the boundary layer fluid flowing along the bullnose ramp during thrust reverser system operation, where the thrust reverser system is configured with a fluid scoop.

Referring to FIG. 7, to increase fluid flow into at least one or more forwardmost and/or upstream-most flow passages 92A (one visible in FIG. 7; see also FIG. 8), the thrust reverser system 38 is configured with one or more fluid scoops 94 (e.g., turning vane structures, extended cascade vanes, etc.) for each respective cascade structure 68. Each fluid scoop 94 is configured to direct a first stream 96 of the fluid through an arcuate scoop passage 98 and into the forwardmost/upstream-most flow passages 92A, where the scoop passage 98 is formed between a first (e.g., forward and/or upstream) surface 100 of the respective fluid scoop 94 and a portion of the bullnose ramp surface 88.

Figure 8:
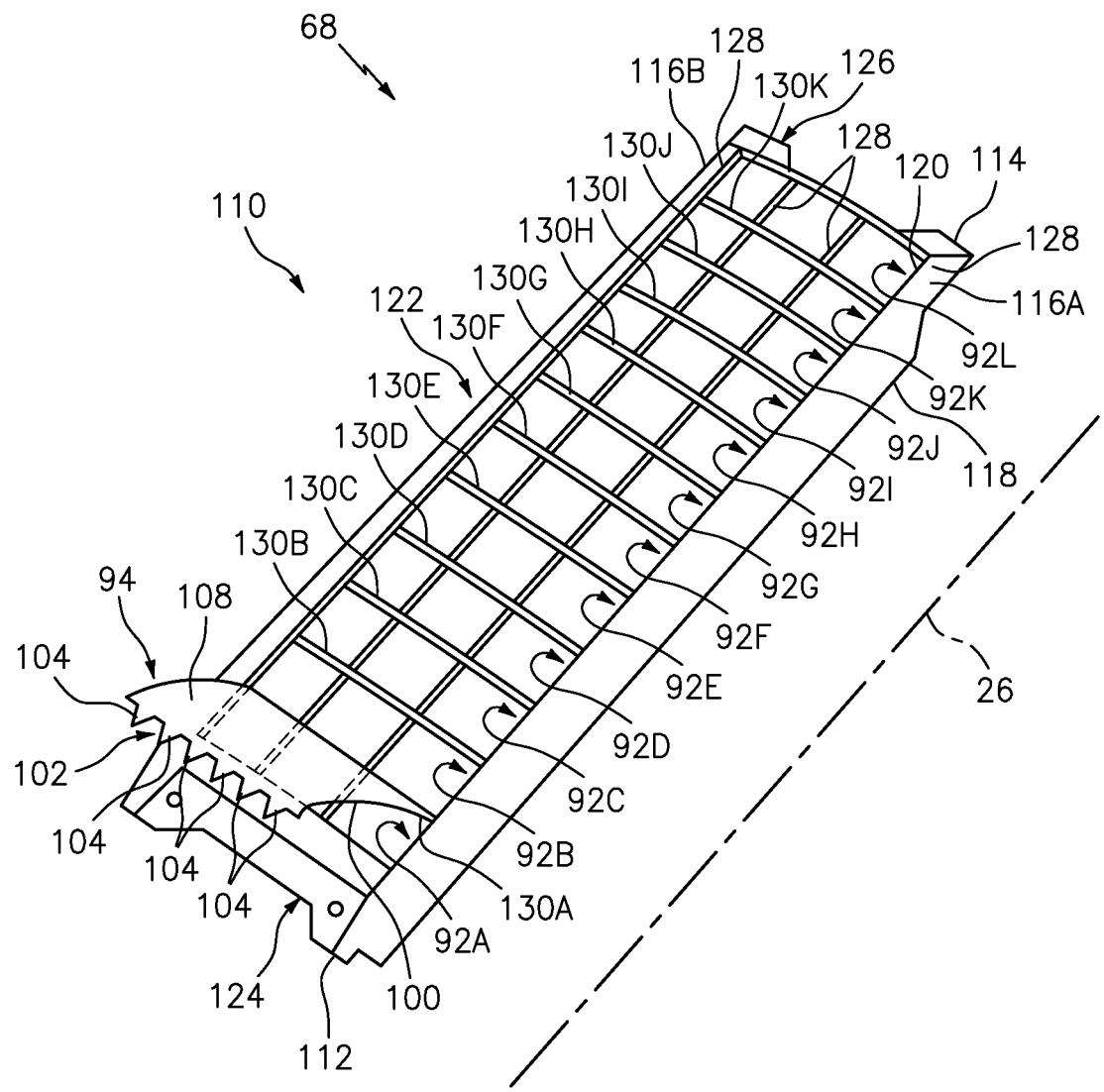
FIG. 8 is a perspective illustration of a cascade basket configured with the fluid scoop.
Figure 9:
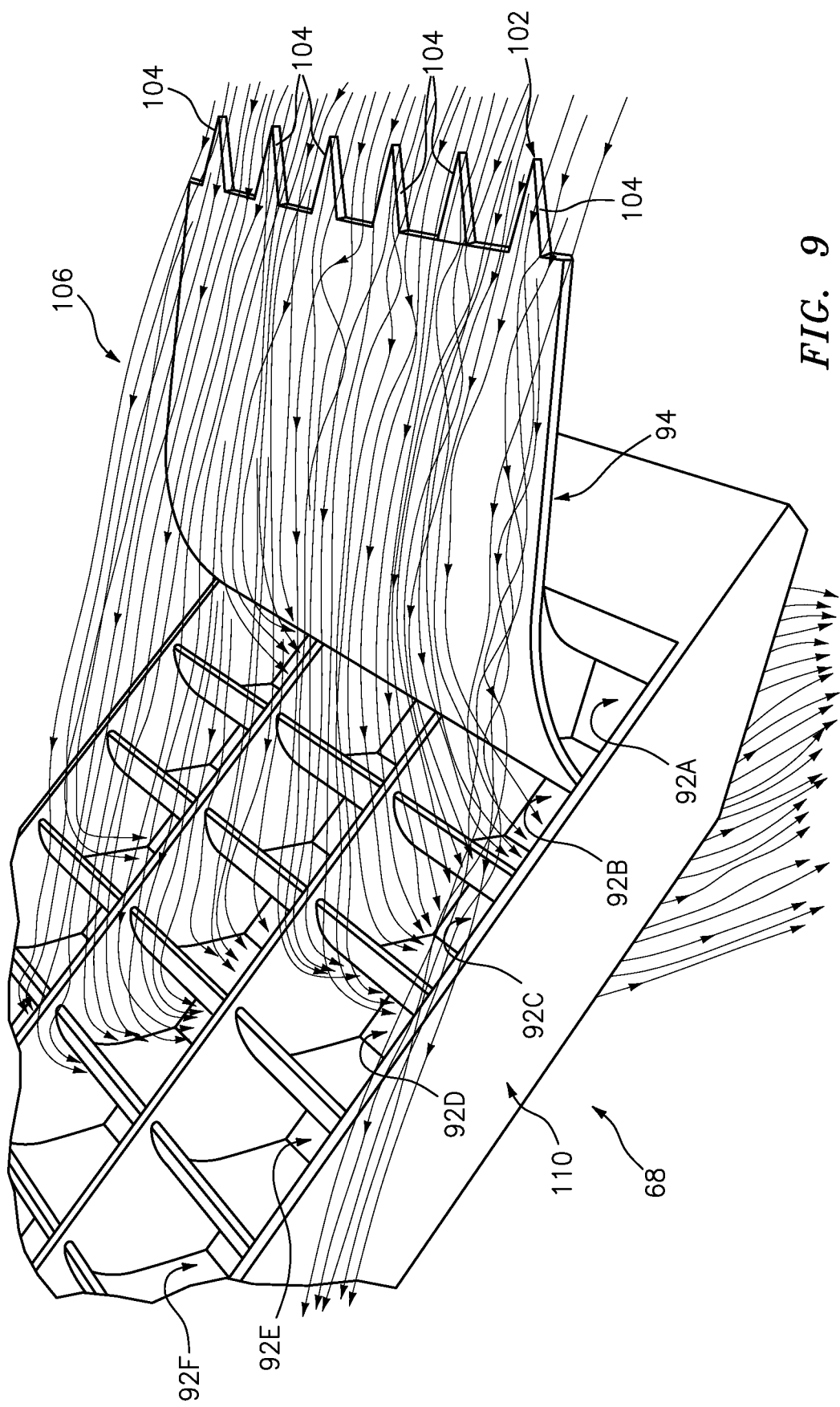
FIG. 9 is a perspective illustration of fluid flowing along the fluid scoop into downstream flow passages in the cascade basket.

Referring to FIG. 8, each fluid scoop 94 of FIG. 8 also includes a serrated (e.g., sawtooth, castellated, wavy, etc.) leading edge 102. This serrated leading edge 102 is formed at least by a plurality of protrusions 104; e.g., projections, extensions, fingers, etc. Each of the protrusions 104 may be configured as a delta wing vortex generator. The protrusions 104, for example, are operable to interact with a second stream 106 of the fluid (see FIG. 7) passing by the serrated leading edge 102. This interaction, referring to FIGS. 7 and 9, may cause vortices to form within the second stream 106 of the fluid, and cause the second stream 106 of the fluid to flow generally along a second (e.g., aft and/or downstream) surface 108 of the fluid scoop 94 and into one or more of the flow passages (e.g., 92B and/or 92C) which are (e.g., immediately) aft and/or downstream of the fluid scoop 94. More particularly, the protrusions 104 may aid in a mixing process within the second stream 106 of the fluid as well as increase momentum of the low velocity flow near the scoop second surface 108 to resist shear forces.

By increasing mass flow into the upstream flow passages (e.g., 92A-C), the fluid scoop 94 and its serrated leading edge 102 may increase efficiency of a forward and/or upstream portion of the thrust reverser system 38. The fluid scoop 94 and its serrated leading edge 102 may consequently also facilitate an overall increase in negative thrust (stopping force) of the thrust reverser system 38. An axial length of the thrust reverser system 38 and one or more or all of its components may therefore be shortened, for example, compared to a thrust reverser system without the fluid scoop 94 as well as compared to a thrust reverser system with a fluid scoop but without the serrated leading edge 102. Shortening the thrust reverser system 38 may provide for more compact thrust reverser packaging and/or reduction in thrust reverser system weight. In addition, the provision of the fluid scoop 94 with its serrated leading edge 102 may also provide for an improved area match between an effective area of the thrust reverser system 38 and an effective area of the bypass nozzle 52.

Each cascade structure 68 may include one or more cascade baskets 110 (e.g., lateral cascade segments) arranged, for example, in an arcuate array about the axial centerline 26. Referring to FIG. 8, each cascade basket 110 extends axially along the axial centerline 26 between and to a first (e.g., forward and/or upstream) end 112 and a second (e.g., aft and/or downstream) end 114. Each cascade basket 110 extends laterally (e.g., circumferentially or tangentially) between and to opposing sides 116A and 116B (generally referred to as "116"). Each cascade basket 110 extends vertically (e.g., radially) between and to a first (e.g., radial inner and/or upstream) side 118 and a second (e.g., radial outer and/or downstream) side 120.

Each cascade basket 110 of FIG. 8 includes a base cascade structure 122 and one or more attachments 124 and 126; e.g., mounting structures. Each of these attachments 124 and 126 is configured to attach/mount the cascade basket 110 and, thus, the respective cascade structure 68 to another structure of the propulsion system 20 such as, but not limited to, the structural beam (e.g., the torque box) or an aft cascade ring (see FIG. 4). The attachments 124 and 126 of FIG. 8, for example, are configured as attachment flanges with apertures for receiving fasteners; e.g., bolds, rivets, etc. The first (e.g., forward and/or upstream) attachment 124 is arranged at the cascade structure first end 112. The second (e.g., aft and/or downstream) attachment 126 is arranged at the cascade structure second end 114.

The base cascade structure 122 includes a plurality of strongback rails 128 and one or more arrays of cascade vanes. The strongback rails 128 of FIG. 8 are arranged parallel with one another. The strongback rails 128 are connected to the attachments 124 and 126. The strongback rails 128 of FIG. 8, for example, extend axially along the axial centerline 26 between and to the cascade attachments 124 and 126.

The arrays of cascade vanes are respectively arranged between laterally adjacent strongback rails 128. Each of the arrays of cascade vanes includes a plurality of the cascade vanes 130A-K (generally referred to as "130"), which are disposed at discrete locations along the axial length of the strongback rails 128. Each axially adjacent pair of vanes 130 thereby forms a respective one of the flow passages 92B-K therebetween. Similarly, each forwardmost and/or upstream-most cascade vane 130A forms a respective one of the upstream-most flow passages 92A with the first attachment 124. Each aftmost and/or downstream-most cascade vane 130K forms a respective one of the aftmost and/or downstream-most flow passages 92L with the second attachment 126.

Each of the cascade vanes 130 is connected to a respective adjacent set of the strongback rails 128. Each cascade vane 130 of FIG. 8, for example, extends laterally between and to a respective adjacent set of the strongback rails 128.

Figure 10:
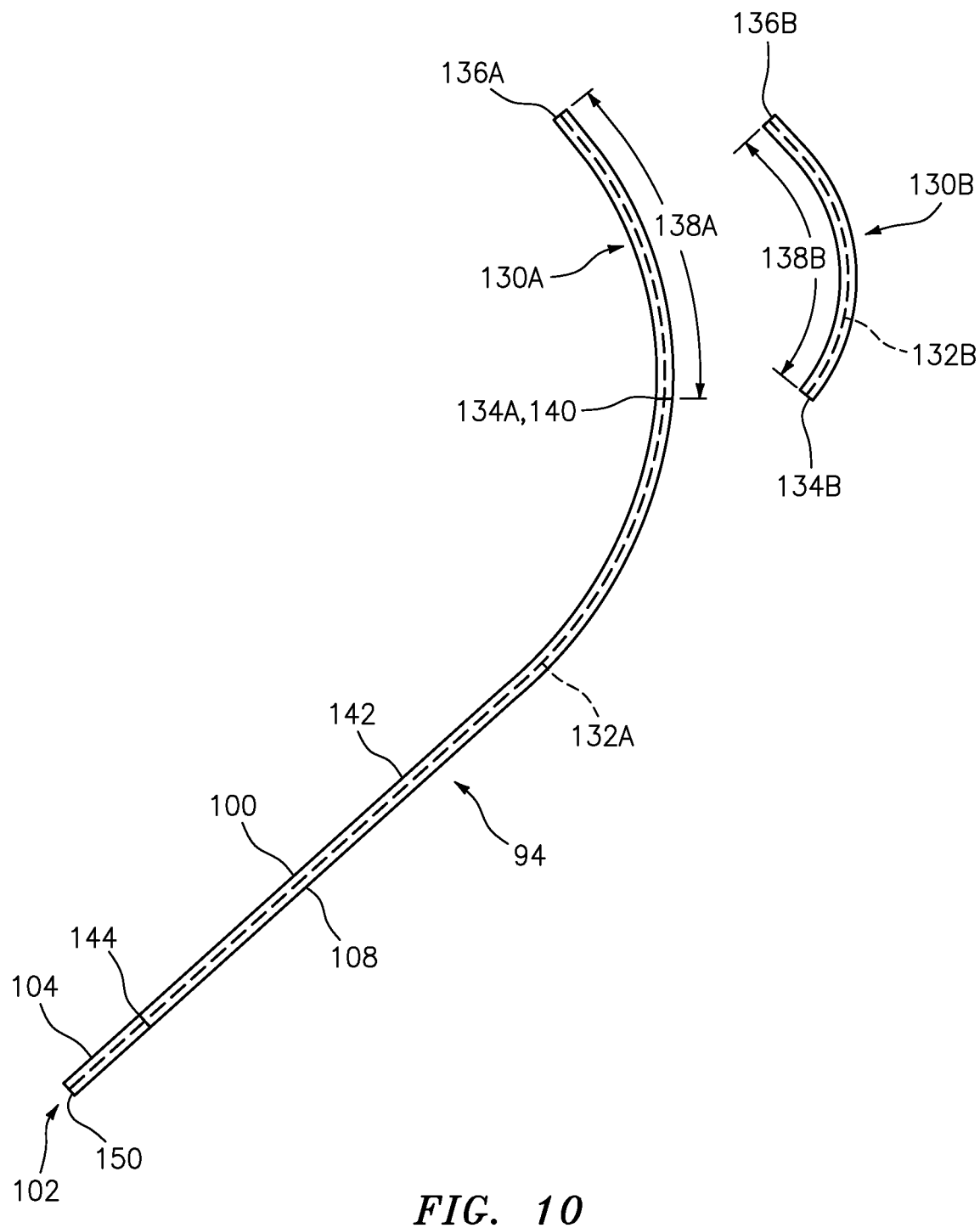
FIG. 10 is a side sectional illustration of a plurality of cascade vanes and the fluid scoop.

Referring to FIG. 10, each of the cascade vanes 130 may have a non-linear (e.g., curved) cross-sectional geometry in order to redirect air flowing through the cascade structure 68 in the axial direction. Each cascade vane (e.g., 130A, 130B) of FIG. 10, for example, extends longitudinally along a (e.g., curved) camber line (e.g., 132A, 132B; generally referred to as "132") between and to a first (e.g., radial inner and/or upstream) end (e.g., 134A, 134B; generally referred to as "134") and a second (e.g., radial outer and/or downstream) end (e.g., 136A, 136B; generally referred to as "136"), which thereby defines a cascade vane length (e.g., 138A, 138B; generally referred to as "138") longitudinally along the camber line 132. The first end 134 of each of the cascade vanes 130B-130K (see also FIG. 8) may define a leading edge of that vane. The second end 136 of each of the cascade vanes 130A-K (see also FIG. 8) may define a trailing edge of that vane.

Each fluid scoop 94 may be connected to one or more of the cascade vanes 130 (e.g., the upstream-most cascade vanes 130A) of a respective cascade basket 110. Each fluid scoop 94 of FIG. 10, for example, is formed as an integral part of the upstream-most cascade vanes 130A of a respective cascade basket 110; e.g., the fluid scoop 94 and the upstream-most cascade vanes 130A may be formed together as a monolithic body. The fluid scoop 94 may thereby be configured as an upstream extension of the upstream-most cascade vanes 130A such that, for example, the components 94 and 130A collectively provide a continuous, extended cascade vane/turning vane. More particularly, a second (e.g., radial outer and/or downstream) end 140 of the fluid scoop 94 may be directly connected to the first end 134A of each cascade vane 130A. Each fluid scoop 94 may thereby extend longitudinally along the camber line 132A from the respective cascade vanes 130A to its serrated leading edge 102.

Each fluid scoop 94 extends transversely between and to the scoop first surface 100 and the scoop second surface 108. The scoop first surface 100 of FIG. 10 is configured as a concave and/or pressure side surface. The scoop first surface 100 of FIG. 10 is also a surface of the respective cascade vanes 130A. The scoop first surface 100 may thereby form a single, continuous aerodynamic concave and/or pressure side surface for both elements 94 and 130A. Similarly, the scoop second surface 108 of FIG. 10 is configured as a convex and/or suction side surface. The scoop second surface 108 of FIG. 10 is also a surface of the respective cascade vanes 130A. The scoop second surface 108 may thereby form a single, continuous aerodynamic convex and/or suction side surface for both elements 94 and 130A.

Referring to FIG. 8, each fluid scoop 94 extends laterally along a respective cascade basket 110. Each fluid scoop 94 of FIG. 8, for example, extends laterally between and to the opposing sides 116A and 116B. The fluid scoop 94 of FIG. 8 may thereby extend laterally along and laterally overlap (e.g., an entirety of) one or more or each of the upstream-most cascade vanes 130A and one or more or each of the upstream-most flow passages 92A of a respective cascade basket 110.

Figure 11:
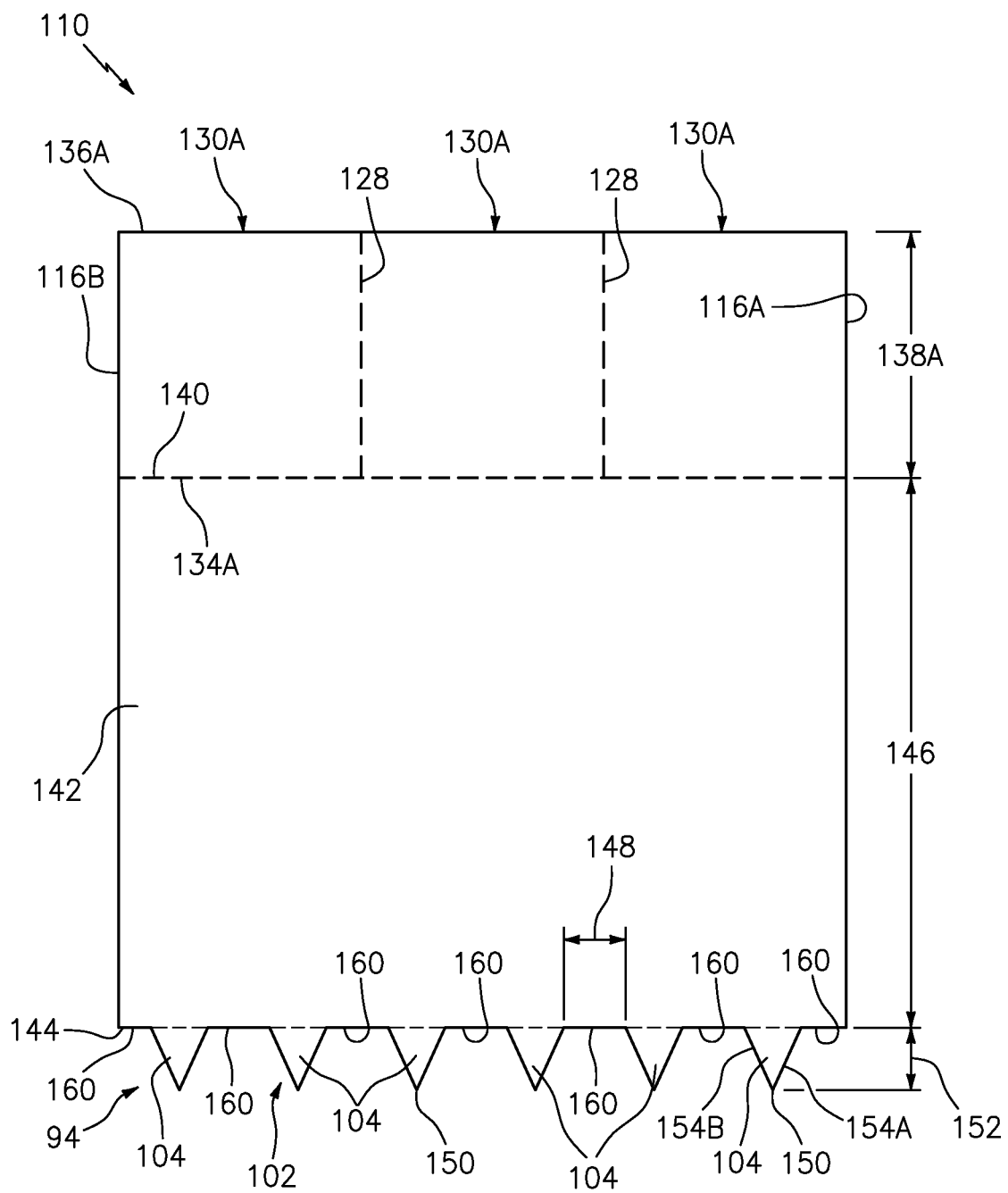
FIG. 11 is a plan view illustration of the fluid scoop configured with one of the cascade vanes.

Referring to FIG. 11, each fluid scoop 94 includes a fluid scoop base 142 and one or more of the fluid scoop protrusions 104. The scoop base 142 extends laterally between and to the opposing sides 116A and 116B. Referring to FIG. 10, the scoop base 142 extends transversely between and thereby forms respective portions of the scoop first surface 100 and the scoop second surface 108. The scoop base 142 extends longitudinally along the camber line 132A from the scoop second end 140 to a first (e.g., radial inner and/or upstream) end 144 of the scoop base 142, which thereby defines a scoop base length 146 (see FIG. 11) longitudinally along the camber line 132A. The scoop base length 146 of FIG. 11 may be between two times (2×) and four times (4×) a variable X, which variable may be equal to the cascade vane length 138A. The present disclosure, however, is not limited to such an exemplary relationship between the scoop base length 146 and the variable X. For example, the scoop base length 146 may alternatively be less than two times (2×) the variable X or greater than four times (4×) the variable X.

The scoop protrusions 104 are connected to (e.g., formed integral with) the scoop base 142. The scoop protrusions 104 are arranged laterally along the scoop base 142 at the base first end 144 in a linear array. Each of the scoop protrusions 104 is laterally spaced, separated from its laterally neighboring (e.g., immediately adjacent) scoop protrusions 104 by a lateral inter-protrusion distance 148.

Figure 12:
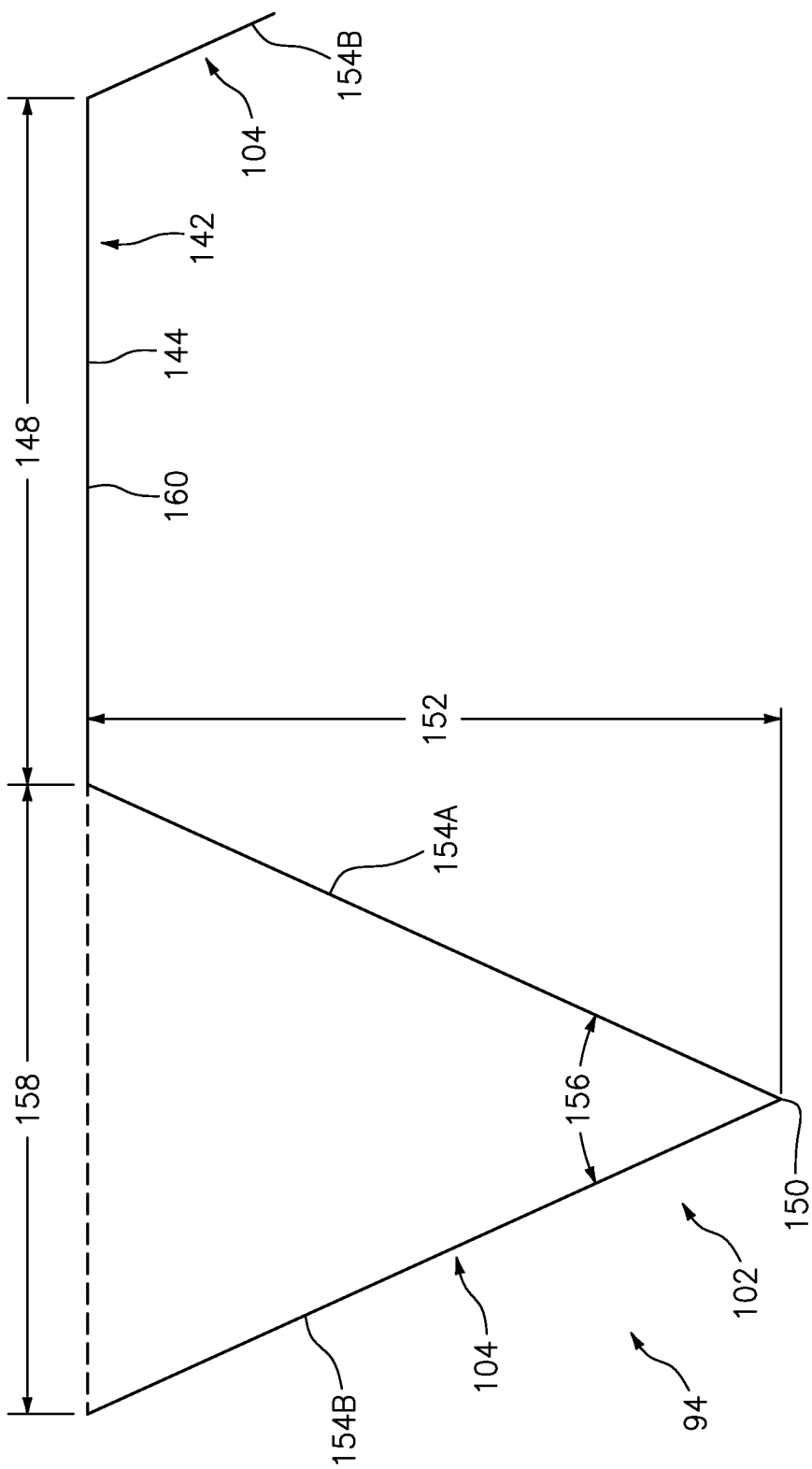
FIG. 12 is a plan view illustration of a portion of the fluid scoop at its serrated leading edge.

Referring to FIG. 12, each scoop protrusion 104 projects longitudinally out from the scoop base 142 (at the base first end 144) along the camber line 132A (see FIG. 10) to a distal end 150 (e.g., a forward and/or upstream end/tip) of that respective scoop protrusion 104, thereby defining a protrusion chord length 152 longitudinally along the camber line 132A (see FIG. 10). This protrusion chord length 152 may be between one-third times (⅓×) and one times (1×) the variable X. The present disclosure, however, is not limited to such an exemplary relationship between the protrusion chord length 152 and the variable X. For example, the protrusion chord length 152 may alternatively be less than one-third times (⅓×) the variable X or greater than one times (1×) the variable X.

The protrusion chord length 152 may also be sized relative to the lateral inter-protrusion distance 148. The lateral inter-protrusion distance 148, for example, may be between two-third times (⅔×) and one and one-half times (1.5×) the protrusion chord length 152. The present disclosure, however, is not limited to such an exemplary relationship between the protrusion chord length 152 and the lateral inter-protrusion distance 148. For example, the lateral inter-protrusion distance 148 may alternatively be less than two-third times (⅔×) the protrusion chord length 152 or greater than one and one-half times (1.5×) the protrusion chord length 152.

Each scoop protrusion 104 has opposing lateral protrusion sides 154A and 154B (generally referred to as "154"). These lateral protrusion sides 154 project out from the base first end 144 to, and may meet at, the protrusion distal end 150. Each scoop protrusion 104 may thereby be configured with a triangular or otherwise tapering geometry. The lateral protrusion sides 154 of FIG. 12 are angularly offset by an included angle 156. This included angle 156 is an acute angle such as, but not limited to, an angle between twenty degrees (20°) and sixty degrees (60°).

Each scoop protrusion 104 extends laterally along the scoop base 142 between and to its lateral protrusion sides 154, thereby defining a protrusion span length 158 laterally along the base first end 144. This protrusion span length 158 may be sized such that an aspect ratio of two times the protrusion span length 158 to the protrusion chord length 152

$$\left(\frac{2 \times \text{protrusion span length}}{\text{protrusion chord length}}\right)$$

is between one (1) and two and one-half (2.5). The present disclosure, however, is not limited to such an exemplary aspect ratio. The aspect ratio, for example, may alternatively be less than one (1) or greater than two and one-half (2.5).

Referring to FIG. 10, each protrusion 104 extends transversely between and thereby forms respective portions of the scoop first surface 100 and the scoop second surface 108.

Referring to FIG. 11, the arrangement of the scoop protrusions 104 along the scoop base 142 collectively form the serrated leading edge 102 of the fluid scoop 94. More particularly, the lateral protrusion sides 154 and exposed portions 160 of the base first end 144 form a distal, peripheral boundary of the fluid scoop 94, which boundary is the serrated leading edge 102 of the fluid scoop 94.

In some embodiments, referring to FIG. 13, one or more or each of the scoop protrusions 104 may be laterally aligned with a (e.g., single) respective one of the flow passages 92 (e.g., 92B). In the specific embodiment of FIG. 13, each flow passage 92B is laterally aligned with a respective pair of the scoop protrusions 104. However, in other embodiments, one or more or each of the flow passages 92 (e.g., 92B) may be laterally aligned with a single one of the scoop protrusions 104 or with three or more of the scoop protrusions 104.

In some embodiments, referring to FIG. 14, one or more of the scoop protrusions 104 (e.g., 104') may be laterally aligned with more than one of the flow passages 92 (e.g., 92B). Each scoop protrusion 104' of FIG. 14, for example, is laterally aligned with and laterally overlaps a laterally neighboring pair of the flow passages 92B. A lateral center of each scoop protrusion 104', for example, may be laterally aligned with a respective one of the strongback rails 128.

In some embodiments, referring to FIG. 8, the scoop protrusions 104 of a respective fluid scoop 94 may be configured with common (e.g., identical) configurations. Each of the scoop protrusions 104, for example, may have an identical shape and size. The present disclosure, however, is not limited to such an exemplary scoop protrusion configuration. For example, in other embodiments, at least one of the scoop protrusions 104 may have a different shape and/or size than at least another one of the scoop protrusions 104.

Figure 15:
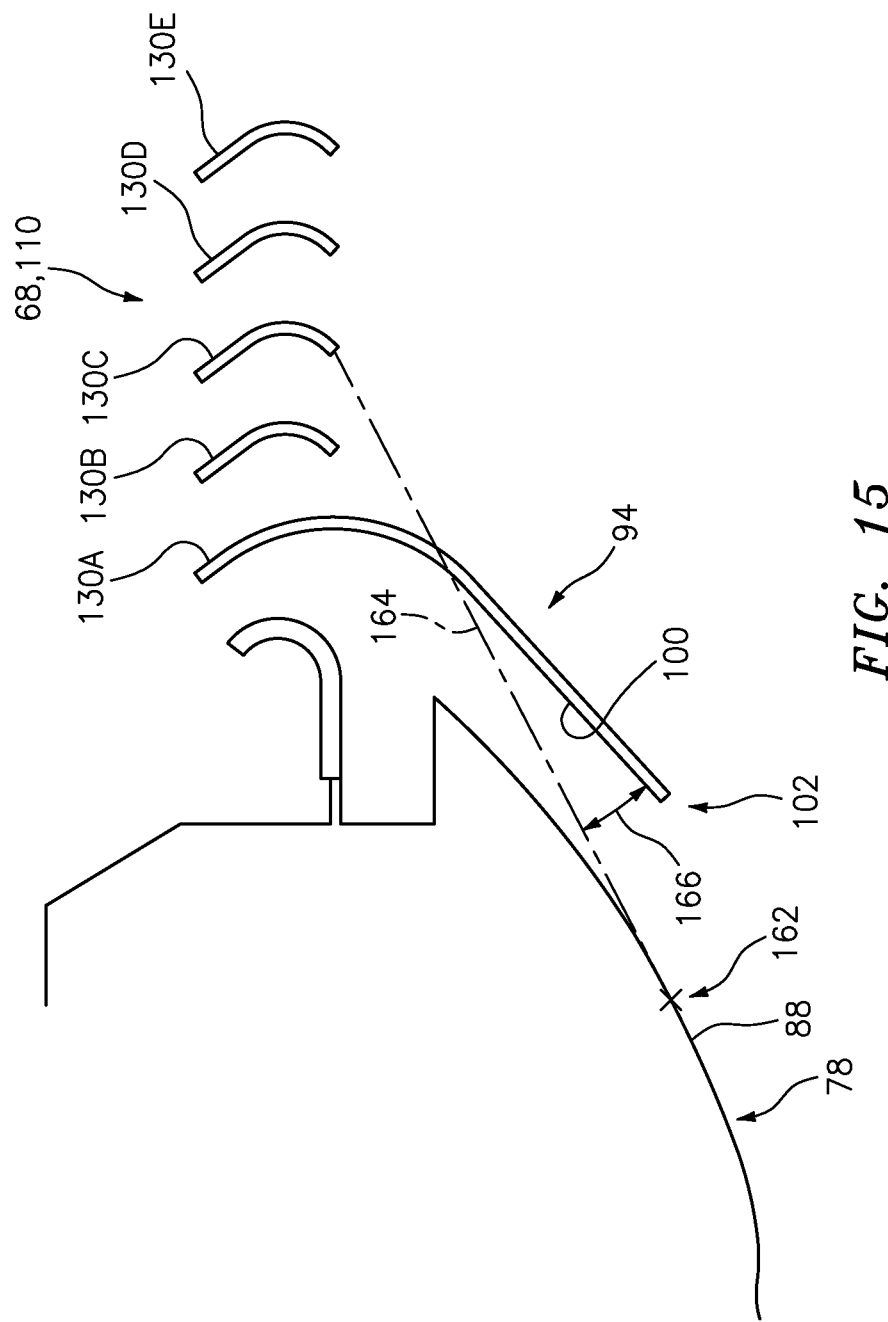
FIG. 15 is a side sectional illustration of a portion of the thrust reverser system.

Referring to FIG. 15, at a point 162 where the first stream 96 of the fluid (see FIG. 7) separates from the bullnose ramp 78, the fluid first stream 96 follows a trajectory 164 that is tangent to the bullnose ramp surface 88. Each respective fluid scoop 94 at (on, adjacent or proximate) its serrated leading edge 102 is angularly offset from the trajectory 164 by an included angle 166; an angle of attack of the respective scoop 94. This included angle 166 is an acute angle such as, but not limited to, an angle greater than zero degrees (0°) and equal to or less than thirty degrees (30°); e.g., about fifteen degrees (15°).

Figure 16:
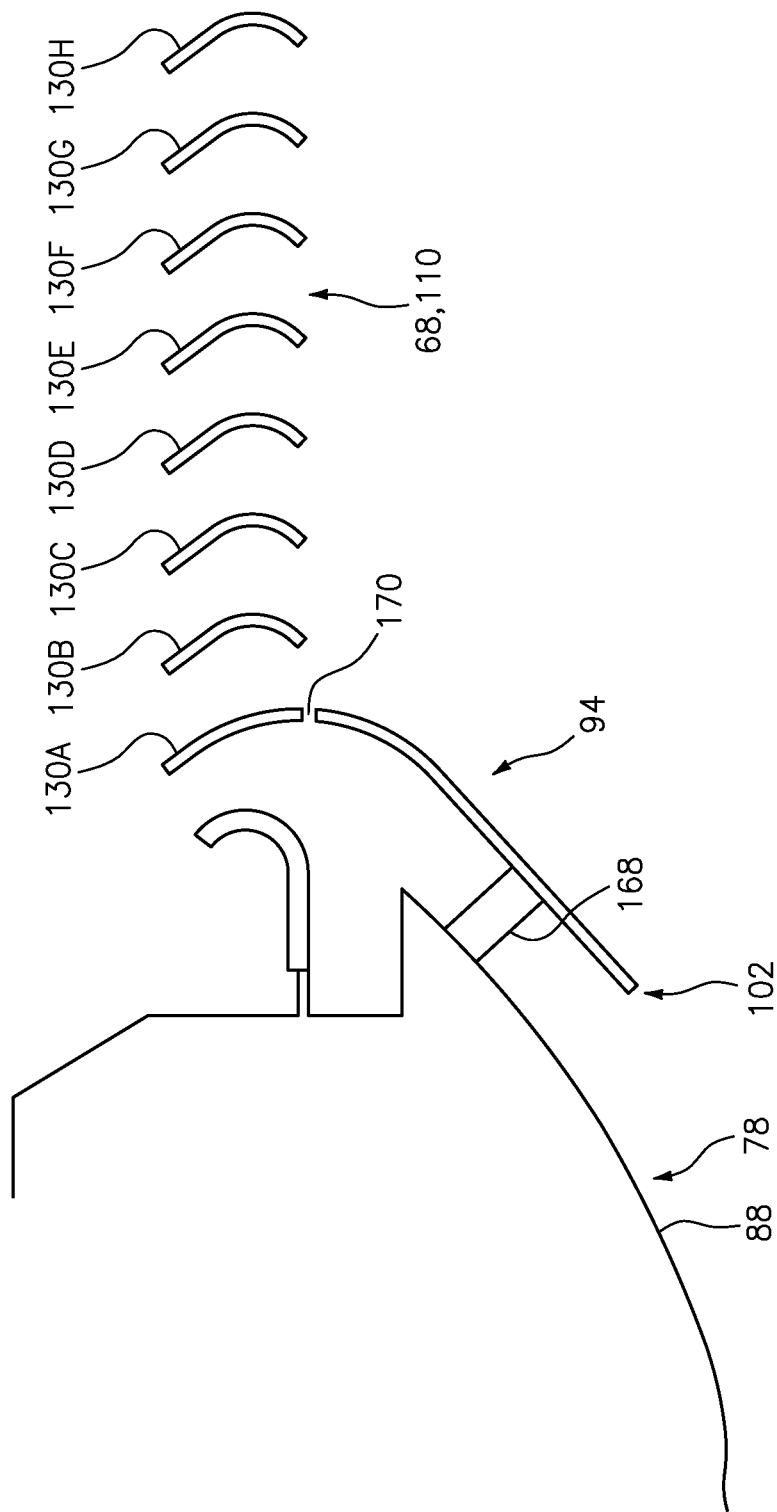
FIG. 16 is a side sectional illustration of a portion of another thrust reverser system.

In some embodiments, referring to FIG. 7, each fluid scoop 94 may be connected to (e.g., formed integral with or attached to) a respective cascade structure 68; e.g., a respective one of the cascade baskets 110. In other embodiments however, referring to FIG. 16, one or more of the fluid scoops 94 may be discrete/separate from the cascade structure 68. Each fluid scoop 94, for example, may be connected to the bullnose ramp 78 (or another structure) by one or more supports 168; e.g., struts, vanes, etc. In such embodiments, the fluid scoop 94 may be separated from the forward-most cascade vanes by a slight gap 170.

While the gas turbine engine is generally described above as a turbofan turbine engine, the present disclosure is not limited to such an exemplary gas turbine engine configuration. For example, in other embodiments, the gas turbine engine may alternatively be configured as a turbojet gas turbine engine where, for example, the forward thrust duct 48 is configured as a core duct and/or an exhaust duct rather than a bypass duct. The present disclosure therefore is not limited to any particular gas turbine engine types or configurations. Furthermore, the present disclosure is not limited to a translating sleeve type thrust reverser. Rather, the cascade structures 68 and the fluid scoops 94 of the present disclosure may be configured with other types and configurations of thrust reverser systems which utilize cascades.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a thrust reverser system comprising a cascade structure and a scoop;
   the cascade structure configured with a plurality of flow passages, each of the plurality of flow passages extending through the cascade structure, and the plurality of flow passages comprising a first flow passage; and
   the scoop configured to direct fluid into at least the first flow passage, the scoop comprising a serrated leading edge.

2. The assembly of claim 1, wherein
   the scoop includes a base and a plurality of protrusions;
   the plurality of protrusions are arranged along an upstream end of the base, and each of the plurality of protrusions projects out from the base; and
   the serrated leading edge is formed at least by the plurality of protrusions.

3. The assembly of claim 2, wherein
   the plurality of protrusions include a first protrusion and a second protrusion;
   the first protrusion laterally neighbors the second protrusion; and
   the first protrusion is laterally spaced from the second protrusion by a lateral inter-protrusion distance.

4. The assembly of claim 3, wherein
   the first protrusion has a chord length that extends from the upstream end of the base to a distal end of the first protrusion; and
   the lateral inter-protrusion distance is between two-third times the chord length and one and one-half times the chord length.

5. The assembly of claim 2, wherein the serrated leading edge is further formed by the base at the upstream end of the base.

6. The assembly of claim 2, wherein the plurality of protrusions have common configurations.

7. The assembly of claim 2, wherein
   the plurality of protrusions include a first protrusion; and
   the first protrusion has a triangular geometry.

8. The assembly of claim 2, wherein
   the plurality of protrusions include a first protrusion;
   the first protrusion has a chord length and a span length, and an aspect ratio of two times the span length to the chord length is between 1 and 2.5;
   the chord length extends from the upstream end of the base to a distal end of the first protrusion; and
   the span length extends laterally along the base between opposing sides of the first protrusion at the upstream end of the base.

9. The assembly of claim 2, wherein
   the plurality of protrusions include a first protrusion;
   the first protrusion has a tip, a first protrusion side and a second protrusion side that meets the first protrusion side at the tip; and
   the first protrusion side is angularly offset from the second protrusion side by an angle between twenty degrees and sixty degrees.

10. The assembly of claim 2, wherein
    the base has a base length that extends longitudinally along a camber line from the cascade structure to the upstream end of the base, and the base length is between two times and four times a variable X; and
    the plurality of protrusions include a first protrusion, the first protrusion has a chord length that extends longitudinally along the camber line from the upstream end of the base to a distal end of the first protrusion, and the chord length is between one-third times and one times the variable X.

11. The assembly of claim 2, wherein
the plurality of protrusions include a first protrusion and a second protrusion;
the first protrusion is laterally aligned with the first flow passage; and
the second protrusion is laterally aligned with the first flow passage.

12. The assembly of claim 2, wherein
the plurality of flow passages further comprise a second flow passage laterally next to the first flow passage;
the plurality of protrusions include a first protrusion and a second protrusion;
the first protrusion is laterally aligned with the first flow passage; and
the second protrusion is laterally aligned with the second flow passage.

13. The assembly of claim 2, wherein
the plurality of flow passages further comprise a second flow passage; and
the first protrusion laterally overlaps the first flow passage and the second flow passage.

14. The assembly of claim 1, wherein
the cascade structure includes a plurality of cascade vanes;
a boundary of each of the plurality of flow passages is formed by a respective one of the plurality of cascade vanes; and
the scoop is integral with and forms an extension of a first of the plurality of cascade vanes.

15. The assembly of claim 1, further comprising:
a forward thrust duct;
the thrust reverser system further comprising a thrust reverser duct and a bullnose ramp;
the cascade structure arranged within the thrust reverser duct;
the bullnose ramp adapted to provide a transition from the forward thrust duct to the thrust reverser duct when the thrust reverser system is in a deployed configuration; and
the scoop connected to the bullnose ramp by one or more supports.

16. The assembly of claim 1, wherein
the cascade structure extends axially along a centerline from a cascade structure upstream end to a cascade structure downstream end; and
the first flow passage is an axially upstream-most one of the plurality of flow passages.

17. The assembly of claim 1, wherein the serrated leading edge extends laterally along an entirety of a lateral length of the first flow passage.

18. An assembly for an aircraft propulsion system, comprising:
a thrust reverser system comprising a cascade structure and a scoop;
the cascade structure comprising a plurality of flow passages and a plurality of cascade vanes, a side boundary of each of the plurality of flow passages formed by a respective one of the plurality of cascade vanes, and the plurality of flow passages comprising a first flow passage; and
the scoop configured to direct fluid into at least the first flow passage, the scoop including a base and a plurality of protrusions, the plurality of protrusions arranged along an upstream end of the base, and each of the plurality of protrusions having a tip and projecting out from the upstream end of the base and laterally tapering to the tip.

19. An assembly for an aircraft propulsion system, comprising:
a thrust reverser cascade structure extending axially along a centerline from an upstream end to a downstream end, the thrust reverser cascade structure configured with a plurality of flow passages and a plurality of vanes;
a side boundary of each of the plurality of flow passages formed by a respective one of the plurality of vanes; and
the plurality of vanes comprising a first vane that is configured with a serrated leading edge.

20. The assembly of claim 19, further comprising:
a scoop configured with the first vane;
the scoop projecting out from an upstream end of the first vane to the serrated leading edge.

* * * * *